(12) United States Patent
Abrahamson

(10) Patent No.: US 6,762,377 B2
(45) Date of Patent: Jul. 13, 2004

(54) WINCH SWITCH

(75) Inventor: Bryce Abrahamson, Holt, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/172,301

(22) Filed: Jun. 13, 2002

(65) Prior Publication Data

US 2003/0230471 A1 Dec. 18, 2003

(51) Int. Cl.$^7$ .................................... H01H 9/06
(52) U.S. Cl. ........................ 200/61.85; 200/61.54
(58) Field of Search .................... 200/61.85, 61.87, 200/61.88, 61.27, 61.28, 61.54, 293.1, 332, 307, 298, 564, 332.2

(56) References Cited

U.S. PATENT DOCUMENTS

| | | | | |
|---|---|---|---|---|
| 3,518,391 A | * | 6/1970 | Hipple | 200/303 |
| 3,805,003 A | * | 4/1974 | Rennels | 200/332.2 |
| 4,508,944 A | * | 4/1985 | Yashima et al. | 200/61.85 |
| 4,565,909 A | * | 1/1986 | Yashima et al. | 200/61.85 |
| 4,710,599 A | * | 12/1987 | Motodate et al. | 200/61.85 |
| 4,847,454 A | * | 7/1989 | Hiruma | 200/61.85 |
| 4,981,121 A | * | 1/1991 | Tani | 123/179.1 |
| 5,232,329 A | * | 8/1993 | Livingston | 414/494 |
| 5,481,077 A | * | 1/1996 | Clegg et al. | 200/61.88 |
| 5,519,378 A | * | 5/1996 | Queensbury | 340/475 |
| 6,225,584 B1 | * | 5/2001 | Ase et al. | 200/61.54 |
| 6,334,269 B1 | * | 1/2002 | Dilks | 37/235 |
| 6,344,621 B1 | * | 2/2002 | Shiratori et al. | 200/61.54 |
| 6,354,777 B1 | * | 3/2002 | Riekki | 410/3 |
| 6,407,663 B1 | * | 6/2002 | Huggett | 340/461 |

* cited by examiner

Primary Examiner—Lincoln Donovan
Assistant Examiner—Lisa Klaus
(74) Attorney, Agent, or Firm—Merchant & Gould, P.C.

(57) ABSTRACT

An apparatus and method for controlling a power winch, and a kit and method for retrofitting an existing control block to control a power winch. The apparatus consists of a control yoke control unit having an engine control switch, a winch control switch, and at least one switch support for supporting the engine control and winch control switches. Both switches are incorporated into the control yoke control unit. The control unit may have only a single switch support with both switches therein, or it may have two switch supports each with one switch. The control unit also includes a mechanism for attaching the control unit to a control yoke, and an electrical connection for connecting the winch control switch to a winch and a source of electrical power. The kit has a winch control switch, and a mechanism for attaching the winch control switch to an existing control yoke control unit. The kit also includes an electrical connection for electrically connecting the winch control switch to a source of electrical power and a winch.

11 Claims, 3 Drawing Sheets

WINCH SWITCH

BACKGROUND OF THE INVENTION

The invention relates to an apparatus and method for controlling a winch. The invention also relates to an apparatus and method for controlling a winch mounted on a vehicle, using an existing control location and existing control and power circuitry.

It has become common to mount power winches on vehicles in order to assist the vehicle operator in manipulating large objects. For example, winches may be used to maneuver trailers, vehicles, or other heavy loads into position for towing or on-board transport. Likewise, winches may be used for removing obstacles, assisting other vehicles that have been immobilized, or to traverse terrain that would otherwise be impassible, such as swamps, steep grades, etc.

In particular, it is known to mount winches on so-called light recreational vehicles, that is, vehicles smaller than an ordinary automobile. Such vehicles include but are not limited to four-wheelers and various so-called "all-terrain vehicles".

Conventional controls for operating a power winch are not entirely satisfactory.

Many such vehicles utilize control yokes, also sometimes referred to as handlebars. A control yoke includes one or more bars transverse to a steering column. Locating the controls on the yoke is convenient, since vehicle operators may then activate winch controls without moving their hands from the control yoke, and thus may conveniently operate the vehicle while controlling the winch.

However, the control yokes on most vehicles already include one or more control blocks. For example, the left yoke of many conventional steering yokes includes the engine control switch. Adding another control block elsewhere on the yoke may be impossible or inconvenient due to lack of space. In addition, increasing the number of control locations may make it more difficult for the vehicle operator to remember which control is located where. In simple terms, the more control locations are present, the more difficult operating the controls becomes.

In addition, many power winches are sold as after-market accessories. Even if space is available, with conventional winch controls it is often extremely difficult to modify an existing control yoke to accept an additional control block for a newly-mounted winch.

Conventional power winch controls may be mounted elsewhere than on the control yoke. For example, controls may be mounted on or near the winch itself. Alternatively, they may be mounted on the body of the vehicle. However, this makes it more difficult for a single vehicle operator to operate the vehicle while simultaneously controlling the winch. As it is often necessary to adjust a winch in mid-operation to accommodate changing circumstances, this can be a significant disadvantage.

SUMMARY OF THE INVENTION

It is the purpose of the claimed invention to overcome these difficulties, thereby providing an improved apparatus and method for controlling a winch.

It is more particularly the purpose of the claimed invention to provide an apparatus and method for controlling a winch from a control yoke, by combining the controls for the winch with controls for another device.

In accordance with the principles of the claimed invention, this may be accomplished with a control yoke control unit having an engine start switch, an engine kill switch, a winch control switch, and at least one switch support for supporting the engine and winch control switches. Thus, both the engine control switches and the winch control switch are incorporated into a single control unit. The control unit may also include additional switches, such as a high beam/low beam control switch for a headlamp. The control unit is adapted to be attached to a control yoke, and includes an electrical connection for connecting the winch control switch to an activator such as a solenoid between a winch and a source of electrical power.

It is also the purpose of the claimed invention to provide an kit and method for retrofitting an existing control yoke to accept additional controls for operating a winch.

In accordance with the principles of the claimed invention, this may be accomplished with a kit having a winch control switch in a winch control switch support adapted to be attached to an existing control yoke control unit. The kit also includes an electrical connection for electrically connecting the winch control switch to a source of electrical power and a winch. The kit may include screws for attaching the winch control switch support to the control yoke.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
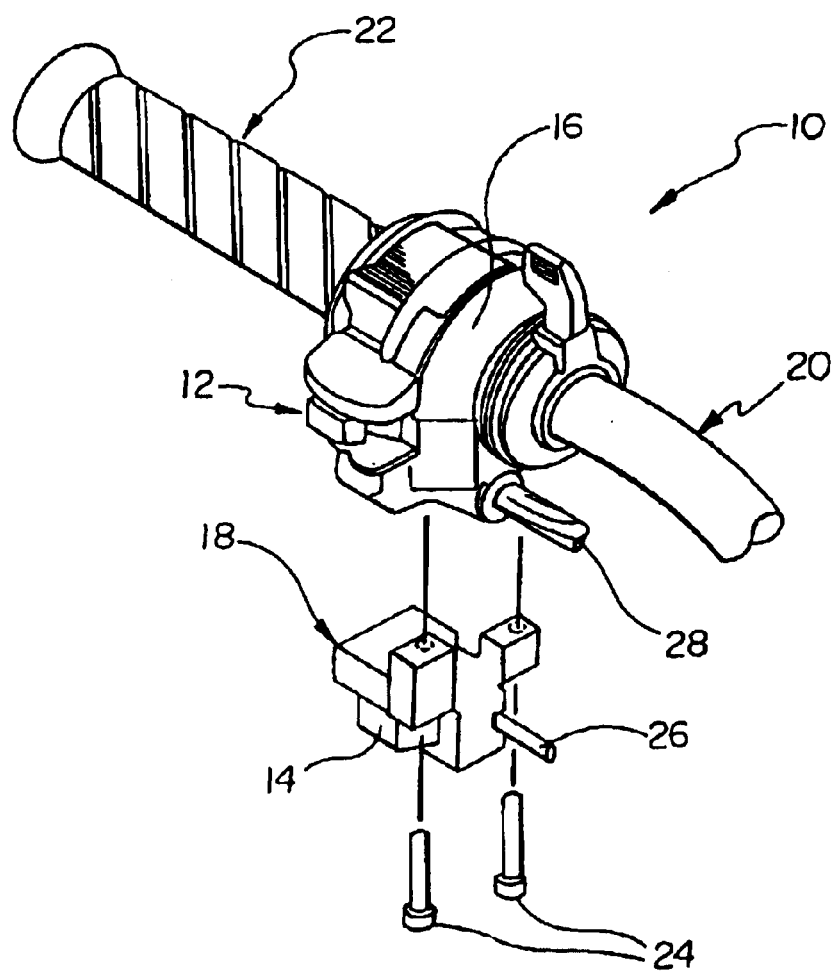
FIG. 1 is an exploded diagram of a winch switch for a control yoke in accordance with the principles of the claimed invention.

Referring to FIG. 1, an embodiment of a control yoke control unit 10 in accordance with the principles of the claimed invention is shown therein.

The control unit 10 includes an engine ignition switch 12 and a winch control switch 14. The control unit 10 also includes at least one switch support 16, 18 for supporting the ignition switch 12 and the winch control switch 14.

The switch supports 16, 18 provide physical support for the engine ignition switch 12 and the winch control switch 14. The ignition switch 12 and the winch control switch 14 are typically at least partially enclosed within the switch supports 16, 18.

The switch supports 16, 18 may be made of any suitably durable material, including but not limited to plastic, rubber, and metal.

A wide variety of switches may be suitable for use as the engine ignition switch 12 and the winch control switch 14. Suitable switches include, but are not limited to, toggle switches, push switches, rocker switches, and slide switches. Switches are well known, and are not described further herein.

The control unit 10 may have more than one switch support 16, 18, each supporting one or more switches. For example, as illustrated in FIG. 1, the control unit 10 has a first switch support 16 and a second switch support 18. In the embodiment shown therein, the first switch support 16 supports the engine ignition switch 12, and the second switch support 18 supports the winch control switch 14.

Such a configuration, wherein each switch has its own switch support, enables simple, modular construction of the control unit 10. This is particularly advantageous for purposes of retrofitting a conventional control unit with a new winch control switch in accordance with the principles of the claimed invention. A new second switch support 18 with the winch control switch 14 can be mounted to an existing, conventional control block.

However, this arrangement is exemplary only. For certain embodiments, it may be equally advantageous to use a single switch support 16, 18 that supports both the engine ignition switch 12 and the winch control switch 14.

As illustrate in FIG. 1, the control unit 10 is affixed to a control yoke 20. As noted previously, a yoke 20 may include as column and one or more transverse bars or arms. However, only a single arm of the yoke 20 is shown therein. As illustrated in FIG. 1, the screws 24 may pass though apertures in the first and second switch support 16 and 18 to secure the supports to the control yoke 20. For example, support 16 maybe split, so that the screws cause the two sections of support 16 to clamp the yoke 20 in a clamshell manner.

Figure 2:
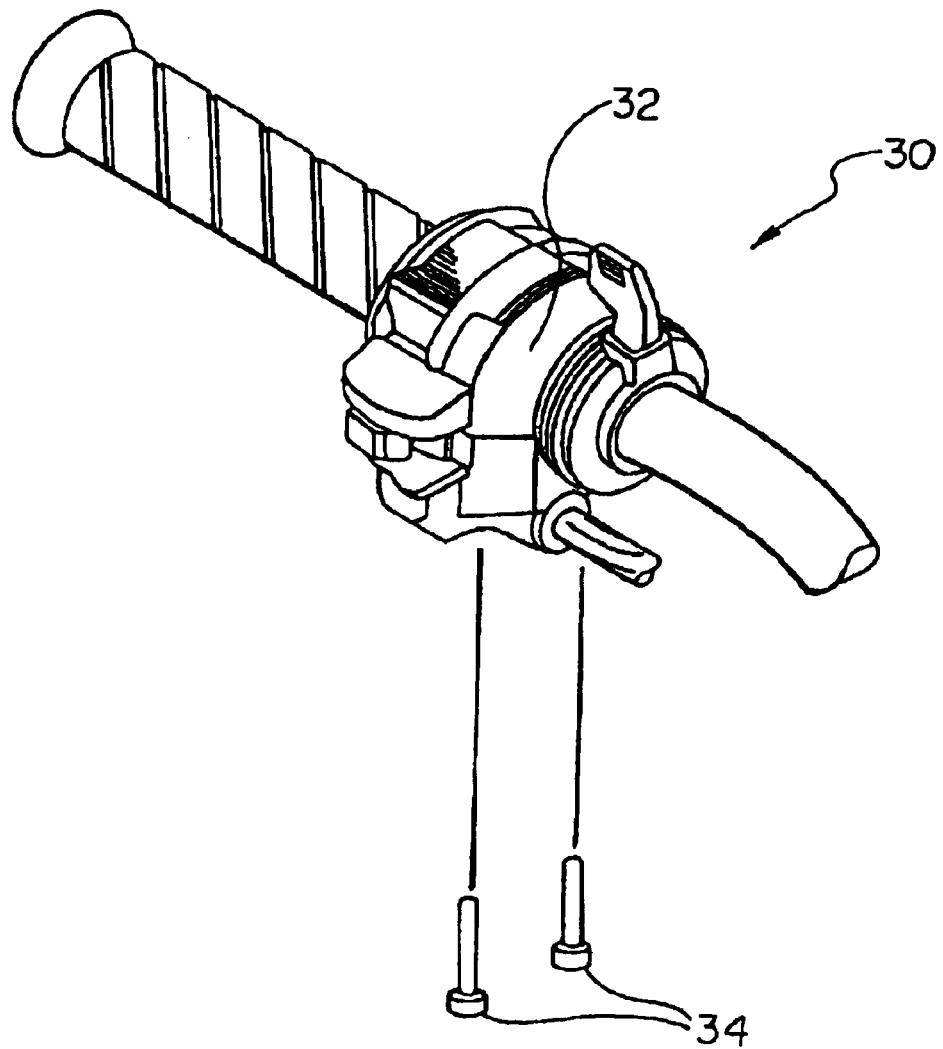
FIG. 2 is an exploded diagram of a conventional control block on a control yoke.

Because screws are conventionally used to affix known control units to control yokes, such an arrangement makes it possible to conveniently retrofit a second switch support 18 with a winch control switch 14. As shown in FIG. 2, previously installed screws 34 may be removed from the switch support 32 of a conventional control unit 30. It is then possible to install a separate second switch support 18 with a winch control switch 14 therein in accordance with the principles of the claimed invention, as shown in FIG. 1.

Typically, when retrofitting a control block 30 wherein the previously attachment used screws 34, the retrofit attachment will use screws 24 that are longer than the screws 34. In this way the new screws may pass completely through the second switch support 18 and extend approximately the same distance into the existing control block 32, so as to be seated in approximately the same position.

However, the use of screws, and the particular arrangement of screws described above, is exemplary only. A variety of other attachments 24 may be suitable for attaching the control unit 10 to the yoke 20. Suitable attaching systems include, but are not limited to, catches, band clamps, and adhesives. These are well known, and are not described further herein.

The switch supports 16, 18 and the switches mounted therein are advantageously disposed near a hand grip 22 on the control yoke 20. This enables the vehicle's operator to conveniently activate the control unit 10 without removing his or her hand from the hand grip 22. However, the precise arrangement of the control unit 10 with respect to the hand grip 22 is exemplary only, and other arrangements may be equally suitable. For example, for certain embodiments it may be convenient to dispose the control unit 10 on or in the hand grip 22 itself, either as an integral part of the hand grip 22 or as a separate component mounted thereto.

As illustrated in FIG. 1, the control unit 10 includes an electrical connection 26 for connecting the winch control switch 14 to a source of electrical power, and a winch. As illustrated in FIG. 1, the electrical connection 26 is a wire (only a portion of which is shown therein) set into to the winch control switch 14. However, this is exemplary only. A variety of alternative electrical connections may be suitable, including but not limited to pin connectors, and wires and cables mounted in alternative fashions.

Figure 3:
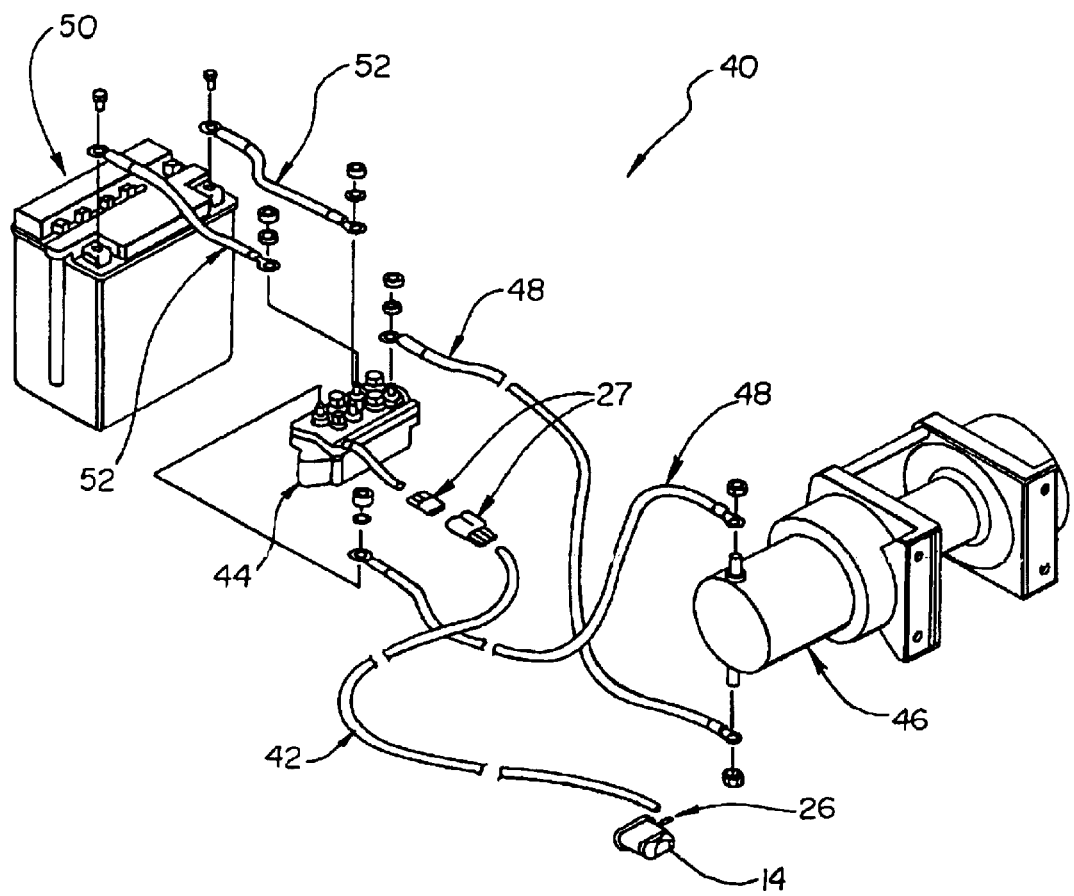
FIG. 3 is an exploded diagram of the components of winch system in accordance with the principles of the claimed invention.

Additional description regarding electrical connections with the winch control switch 14 is provided with regard to FIG. 3.

In addition, the control unit 10 may include an ignition connection 28 for electrically connecting the engine ignition switch 12 with a power source and an ignition system. As illustrated in FIG. 1, the ignition connection 28 includes an external cable. However, this is exemplary only, and other ignition connections 28 may be equally suitable. Ignition connections 28 and ignition systems are well known, and are not described further herein.

FIG. 3 shows an exploded diagram of the various components of an exemplary winch system 40 to which a winch control switch 14 in accordance with the principles of the claimed invention might be connected. In order to illustrate the arrangement of the various overlapping and interconnected components clearly, winch system 40 is shown with gaps between components. It will be appreciated by persons of skill in the art that in order to produce electrical continuity, the components will be in contact when actually in use.

As illustrated in FIG. 3, the electrical connection 26 for the winch control switch 14 is connected electrically to a switch cable 42, and the switch cable 42 is connected at its opposite end to a switching mechanism 44 via a switching mechanism connection 27.

In the embodiment illustrated, the switching mechanism 44 is a solenoid, which acts to control the flow of operating current through the winch system 40. That is, the winch control switch 14 controls the switching mechanism 44, rather than controlling the flow of operating current directly. It is often advantageous to use a switching mechanism 44 such as a solenoid as an intermediate device when using hand-operated switches such as the winch control switch 14 to control an electrical system of considerable power. In this way, the winch control switch 14 that the operator actually touches is only energized with enough power to operate the switching mechanism 44.

If an intermediate switching mechanism 44 is not used, it is necessary to energize the winch control switch 14 with enough power to operate the entire winch system 40. In such an arrangement it would be necessary to provide a current path to and from the winch control switch 14 that is robust enough to accept the electrical loads, i.e. a heavy insulated cable. Providing such a current path may not be desirable for many embodiments.

Nevertheless, the use of a separate switching mechanism 44 is exemplary only, and it may be excluded from certain embodiments of the claimed invention. In addition, it is noted that the switching mechanism 44 is not limited only to a solenoid as shown in FIG. 3.

Likewise, the use of a switching mechanism connection 27 is exemplary only. As illustrated in FIG. 3, the switching mechanism connection 27 is a pin connector. However, a variety of other mechanisms may be equally suitable. Alternatively, the switching mechanism connection 27 may be omitted, with the switch cable 42 being connected directly with the switching mechanism 44.

Returning to FIG. 3, in the exemplary embodiment illustrated therein, the switching mechanism 44 is connected to a winch 46 by winch cables 48. As illustrated, there are two winch cables 48, one positive and one negative. However, this is exemplary only. For certain embodiments, it may be equally suitable to have a different number of winch cables 48, i.e. to use a single coaxial cable for forward and reverse, etc.

In addition, the switching mechanism 44 is connected to a power source 50 by power cables 52. As illustrated in FIG. 3, the power source 50 is a battery. However, this is exemplary only. Other power sources, including but not limited to a vehicle alternator or a separate electrical generator, may be equally suitable. As with the winch cables 48, two power cables 52 are illustrated, one positive and one negative. However, this is exemplary only. It may be equally suitable to have a different number of power cables 52.

It is noted that for many vehicles, it may be convenient for the ignition system and the winch to operate from the same power source 50. Likewise, for certain embodiments, it may be convenient for the various current paths connected with the engine ignition switch 12 and those connected with the winch control switch 14 to be adjacent or proximate one another for at least some portion of their lengths. For example, they may share a wiring harness, etc. However, this is exemplary only, and their conductor path may be completely separate in other embodiments.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A control yoke control unit comprising:
    a first switch support;
    an engine control switch supported by said first switch support;
    a second switch support;
    a winch control switch supported by said second switch support;
    at least one attachment for attaching said switch supports to said control yoke, wherein each of said at least one attachment attaches said first and second switch supports to said control yoke;
    an electrical connection for connecting said winch control switch to a winch and a source of electrical power.

2. The control yoke unit according to claim 1, wherein said at least one attachment comprises a screw.

3. The control yoke unit according to claim 1, wherein said at least one attachment extends through said second switch support and into said first switch support.

4. A kit for attaching a winch control to an existing control unit on a control yoke, the kit comprising:
    a winch control switch;
    a winch switch support;
    at least one attachment for attaching said winch switch support and said existing control unit to said control yoke;
    an electrical connection for electrically connecting said winch control switch to a winch and a source of electrical power.

5. The kit according to claim 4, wherein said at least one attachment comprises a screw.

6. The kit according to claim 4, wherein said at least one attachment extends through said winch switch support and into said existing control unit.

7. A method for mounting a winch control switch on a control yoke, comprising the steps of:
    removing at least one existing attachment from an existing control unit on said control yoke;
    attaching a winch switch support with a winch control switch therein and said existing control unit to said control yoke using at least one attachment; and
    connecting said winch control switch to a winch and a source of electrical power with an electrical connection.

8. The method according to claim 7, wherein:
    said at least one existing attachment comprises an existing screw, and said at least one attachment comprises a screw.

9. The method according to claim 8, wherein said screw is longer than said existing screw.

10. The method according to claim 7, wherein said at least one attachment extends through said winch switch support and into said existing control unit.

11. A control yoke control unit comprising:
    a switch support;
    an engine control switch supported by and disposed in said switch support;
    a winch control switch supported by and disposed in said switch support; and
    at least one screw disposed in said switch support, wherein each of said at least one screw attaches said switch support to an arm of said control yoke;
    an electrical connection for connecting said winch control switch to a winch and a source of electrical power.

* * * * *